Figure 1:
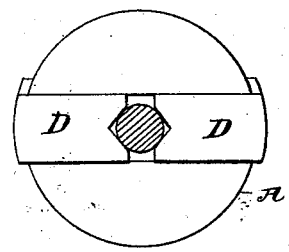

(No Model.) 2 Sheets—Sheet 1.

C. T. PRATT.
DRILL CHUCK.

No. 455,490. Patented July 7, 1891.

Attest:
C. M. Benjamin
John E. Agar

Inventor,
Charles T. Pratt,
by D. Walter Brown
his Attorney (No Model.) 2 Sheets—Sheet 2.

C. T. PRATT.
DRILL CHUCK.

No. 455,490. Patented July 7, 1891.

Attest:
C. M. Benjamin
John G. Agar

Inventor:
Charles T. Pratt
by D. Walter Brown,
his Attorney.

UNITED STATES PATENT OFFICE.

CHARLES T. PRATT, OF CLAYVILLE, NEW YORK, ASSIGNOR TO THE PRATT CHUCK COMPANY, OF SAME PLACE.

DRILL-CHUCK.

SPECIFICATION forming part of Letters Patent No. 455,490, dated July 7, 1891.

Application filed February 20, 1891. Serial No. 382,263. (No model.)

*To all whom it may concern:*

Be it known that I, CHARLES T. PRATT, a citizen of the United States, and a resident of Clayville, in the county of Oneida and State of New York, have invented certain new and useful Improvements in Drill-Chucks, of which the following is a specification.

My invention relates to improvements in drill-chucks, and especially to improvements in that kind of drill-chucks for which a patent of the United States was granted to me on the 19th day of August, 1890, numbered 434,460, and which kind of drill-chucks contains a slotted piece which has a slight movement in the chuck in a direction transverse to the axis of rotation of said chuck, and said slotted piece serving the double purpose of, on the one hand, revolving a drill as the chuck revolves independently of the jaws of the chuck, thereby diminishing the wear on the said jaws, and, on the other hand, of compensating for irregularities in the form of the drill-stock, so that said jaws can accurately align the drill in the chuck, notwithstanding that said slotted piece engages the end of the said drill-stock. In the said Patent No. 434,460 the said slotted piece has lateral extensions or arms, which serve as guides for the movement of the slotted piece, and also serve to rotate the said slotted piece as the chuck revolves; but said lateral arms require the making of lateral passages through the chuck, which said lateral passages cannot be forged or bored at the same operation as the chuck is made, but require a different operation. I have therefore invented the chuck hereinafter described for the purpose of avoiding the necessity of the said lateral passages. I now insert the said slotted piece, which I call an "equalizing driver," in a chamber which is sunk into the chuck from the rear face, and is readily formed by boring or forging; and said chamber also serves as a hole to secure the chuck to the plug or arbor by which it is fixed in a lathe. The said slotted piece or driver is inserted in said chamber, so as to have a small movement therein in a direction transverse to the axis of rotation of the chuck, and said slotted piece or driver is caused to revolve by engaging with the end of the said plug or with a pin which is driven diametrically through the chuck and passes with an easy working fit through the said slotted piece or driver. The said driver, although engaged by said plug or by said pin, can move, as said, in a direction transverse to the axis of rotation of said chuck. I can use either the said engagement of the driver on the said plug or on the said pin alone, dispensing with the other, or I can combine both in a single chuck, and said pin, besides serving to rotate the said driver, also serves to retain it in the chuck when the plug is withdrawn.

Figure 2:
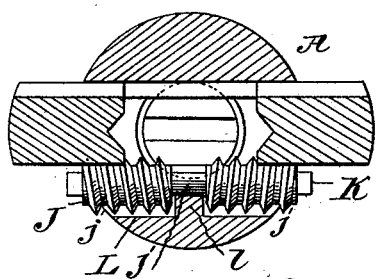
Figure 3:
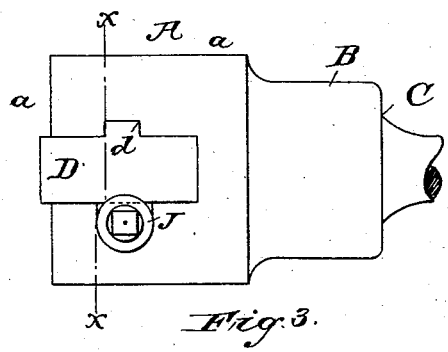
Figure 4:
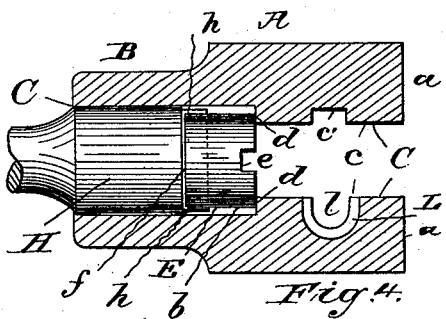
Figure 5:
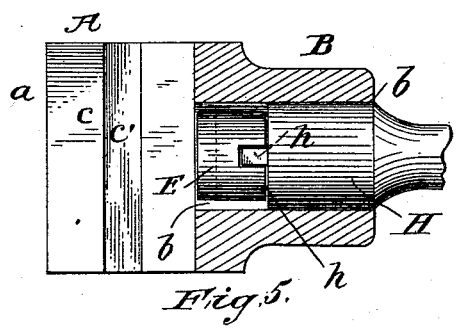
Figure 6:
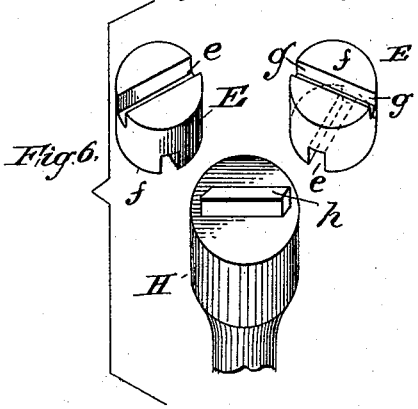
Figure 10:
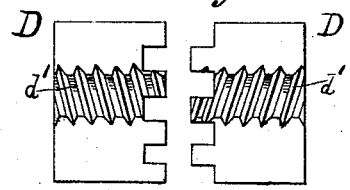
Figure 7:
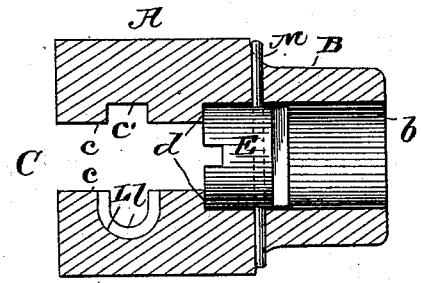
Figure 8:
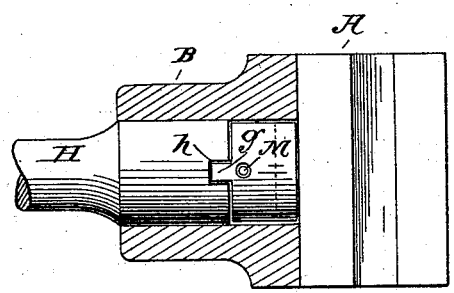
Figure 9:
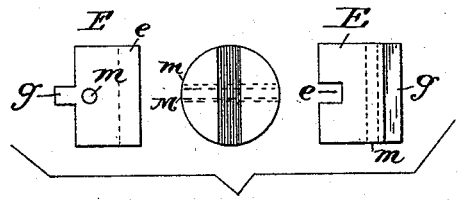

Referring to the drawings which accompany the specification to aid in describing the invention, Figure 1 is an end view of the chuck, showing the jaws closed on the stock of a drill. Fig. 2 is a cross-section of the chuck on the line $xx$ of Fig. 3, the jaws being represented as quite wide apart. Fig. 3 is a longitudinal elevation of the chuck, showing the relative position of the jaws and the screw for operating the jaws. Fig. 4 is a longitudinal section through the middle of the chuck, the plug and driver being shown in elevation. Fig. 5 is a longitudinal section and elevation on a plane perpendicular to the plane of Fig. 4. Fig. 6 shows perspective views of the driver and the plug. Figs. 7 and 8 are longitudinal sectional views of a modification of the chuck wherein a pin is passed transversely through the chuck and through the driver. The planes of said figures are perpendicular each to the other. Fig. 9 shows plan views and an elevation of the driver. Fig. 10 is a view of the under side of the jaws.

A is the drill-chuck, which is preferably formed of steel and is cylindrical in shape and with a rear part B of smaller diameter than the part A, and said part B is bored out or otherwise fashioned with an axial chamber $b$. Said chamber $b$ is preferably circular in cross-section and enters a considerable distance into the chuck A, and usually a little beyond the junction of aforesaid parts A and B, as shown in Figs. 4 and 5. At its innermost end said chamber $b$ connects with the opening C, which extends forward to the front face $a$ of said chuck A. Said opening C is formed with parallel side walls c c, Figs. 4, 5, and 7, and in said opening C the jaws D, which align the drill work as hereinafter described. At the inner end of the said chamber b, and at its junction with the opening C, are formed shoulders d d, as seen in Fig. 4, which shoulders d d prevent the driver E from falling into the opening C or from tilting cornerwise in the chamber b. Said driver E is preferably a cylinder of steel with a diameter a little less than the diameter of the chamber b, so that when the said driver E is in its place in said chamber b it can move a little from side to side therein, and the relation of the diameter of the driver E to the diameter of the chamber b is such that in no position of the said driver E can its edge get clear of said shoulders d d. Said driver E has a central hole e in its front face to receive the end of a drill, and said hole e may be square or may be a long slot, as indicated in Fig. 6, and of course in place of the hole e, to receive the end of the drill, there might be a central projection on the said driver E, and a socket to fit on such projection in the end of the drill-stock; but a hole in the driver E to receive the end of the drill is preferable. The rear face f of the driver E is a plane surface parallel to the front face of said driver E and it preferably has a diametrical slot g, which extends across the rear face of the driver E, and in a direction perpendicular to the length of the slot e in the front face of said driver. In case there is a square hole e in the front face of the driver E in place of a long slot then the length of the said slot g will preferably be in a direction perpendicular to the direction of the movement of the jaws D. The said slot g engages with an easy working fit upon a projection or rib h of the plug H. Said rib extends diametrically entirely or almost entirely across the end of said plug H, so that the driver E can slide to and fro along on said rib h, and the said plug H is tightly driven or screwed into the aforesaid chamber b in the chuck A and enters therein just so far that the said rib h will be entered into the slot g in the driver E, and also so that there will be sufficient space between the end of the plug H and the aforesaid shoulders d d to permit of the easy play of the driver E in said space, and said plug H also serves for connecting the chuck A with a lathe in any usual manner.

Now it is evident that by reason of the aforesaid engagement of the driver E upon the rib h when the chuck A revolves said driver E must also revolve, and if the end of a drill be fitted into the slot e in the driver E then said driver E will revolve said drill. It is also evident that in place of the aforesaid engagement of the slot g of the driver E upon the rib h there might be a rib g on driver E, as in Figs. 7 and 8, which rib might enter a slot h in the plug H, the latter arrangement being the equivalent of the former. Now the driver E being adapted to engage the end of a drill-stock, as herein described, jaws, as D D, of any usual kind may be employed to align and hold the drill. In the drawings I show such jaws D D two in number inserted in the aforesaid opening C, and each of said jaws has a rib d, which enters a recess c′ in one of the walls c for the purpose of giving a true rectilinear motion to said jaws D D, and also of retaining the said jaws D D in the chuck A. Said jaws D D each have V-shaped teeth on their internal faces, as in Fig. 1, to grip the stock of a drill, and on their under side opposite to the rib d each jaw D has a section of a female screw d′ d′, the threads of one section being right-handed and the threads of the other section being left-handed, as shown. The said screw-threads d′ d′ engage upon the threads of corresponding sections of a male screw J, which passes transversely through an opening L in the chuck A and parallel to the aforesaid rib d, and said screw J is made with two parts j j, united by a middle spindle j′ of smaller diameter than the parts j j. The aforesaid opening L is substantially semicircular in section and of a size to easily fit the screw J, and has smooth walls, so as not to engage with the threads of the screw J, and said opening L has a collar l at its middle part corresponding to the spindle j′. Thus when the screw J is in its place in the chuck said screw J can turn freely, but cannot move lengthwise. Now it is evident that the jaws D D having been placed in the chuck until their threads d′ d′ engage with the threads of the screw J, then if said screw J be turned in the one direction by a key engaging upon its end K said jaws D D will be drawn inward until they meet in the center of the chuck A, and if the said screw J be turned in the opposite direction then said jaws D D will be opened widely apart.

The operation is as follows: A drill N is inserted in the chuck A, the jaws D D being open, and the end of the drill N is inserted in the slot e in the driver E. Then the jaws D D are closed on the drill N, thereby accurately aligning the said drill. Should the drill-stock be out of true, so that the end which enters the said slot e in driver E is not accurately in the center of the chuck, then said driver E will move a little to one side or the other to compensate for the inaccuracy of the drill end. Now the chuck being revolved in a lathe the driver E will revolve the drill and relieve the jaws D D of the strain which comes on them when said jaws are alone relied on to revolve the drill.

In Figs. 7 and 8 are views of a chuck with a pin M, which is driven quite tightly diametrically through the chuck A and passes with an easy working fit through a hole m in the driver E. In said Figs. 7 and 8 a rib g is shown on the rear face f of said driver E, and said rib g enters a socket h in the end of the plug H. The direction of said rib g is perpendicular to the direction of the slot e in the front face of the driver E. The general construction of the chuck A, the plug H, jaws D D, and screw J (said jaws and screws not being shown in Figs. 7 and 8) is the same as hereinbefore described, and therefore does not require further description. It is evident that both the pin M and the engagement of the driver E with the plug H co-operate to revolve said driver E, and that either said pin M or said engagement between the driver E and the plug H may be omitted and the other alone relied on to revolve said driver E.

Having thus described my invention, I claim—

1. The combination of a drill-chuck having an axial chamber, a driver adapted to engage a drill inserted into said chamber so as to have a slight movement therein in a direction transverse to the axis of the chuck, and devices for engaging said driver with said chuck, as described.

2. The combination of a drill-chuck having an axial chamber, a driver adapted to engage a drill inserted into said chamber so as to have a slight movement therein in a direction transverse to the axis of the chuck, a plug fixed in the chamber of said chuck, and a device for engaging the said driver with said plug, as described.

3. The combination of a drill-chuck having an axial chamber, a driver adapted to engage a drill inserted in said chamber so as to have a slight movement therein in a direction transverse to the axis of the chuck, and a pin passing through said chuck and with a working fit through a hole in said driver, as described.

Signed at Clayville, in the county of Oneida and State of New York, this 13th day of February, A. D. 1891.

CHARLES T. PRATT.

Witnesses:
C. HUMPHREY,
JOHN DEMPSEY.